United States Patent
Barksdale

Patent Number: 6,010,804
Date of Patent: Jan. 4, 2000

[54] PROTECTIVE COVER AND CONNECTION DEVICE FOR BATTERIES

[76] Inventor: Henry R. Barksdale, 7906 Mary Ann Pl., Baton Rouge, La. 70809

[21] Appl. No.: 09/070,125

[22] Filed: Apr. 30, 1998

[51] Int. Cl.[7] .............. H01M 2/02; H01M 2/00; H01M 2/08

[52] U.S. Cl. .............. 429/178; 429/163; 429/175; 429/100

[58] Field of Search ............... 429/96, 100, 175, 429/163, 178, 179, 121; 439/755, 756, 761, 762, 764, 765, 766

[56] References Cited

U.S. PATENT DOCUMENTS

| | | | |
|---|---|---|---|
| 3,146,132 | 8/1964 | Nathan | 136/166 |
| 3,825,447 | 7/1974 | Kraals | 136/166 |
| 3,867,007 | 2/1975 | Wening | 339/236 |
| 4,255,502 | 3/1981 | Taylor, III | 429/163 |
| 4,444,853 | 4/1984 | Halsall et al. | 429/54 |
| 4,699,855 | 10/1987 | Abraham et al. | 429/175 |
| 4,700,961 | 10/1987 | Thomas et al. | 280/152 A |
| 4,770,958 | 9/1988 | Newman et al. | 429/177 |
| 4,807,895 | 2/1989 | Thomas et al. | 280/853 |
| 4,808,495 | 2/1989 | Goldstein | 429/175 |
| 4,840,855 | 6/1989 | Foti et al. | 429/120 |
| 4,952,468 | 8/1990 | Abraham et al. | 429/175 |
| 5,021,013 | 6/1991 | Wiesler | 439/755 |
| 5,278,002 | 1/1994 | Hiers | 429/175 |
| 5,293,951 | 3/1994 | Scott | 180/68.5 |
| 5,389,462 | 2/1995 | Lin | 429/121 |
| 5,439,761 | 8/1995 | Hunag | 429/100 |
| 5,599,210 | 2/1997 | Green | 439/763 |
| 5,635,818 | 6/1997 | Quintero | 320/25 |
| 5,643,693 | 7/1997 | Hill et al. | 429/121 |

Primary Examiner—Maria Nuzzolillo
Assistant Examiner—Raymond Alejandro
Attorney, Agent, or Firm—John F. Sieberth; R. Andrew Patty, II

[57] ABSTRACT

A battery cover which is detachably attachable to a battery, the battery comprising a top portion, a side wall portion, a positive terminal and a negative terminal. The battery cover comprises a positive and a negative terminal connector, a positive wire connector which is connected to the positive terminal connector by a first segment of electrically conductive material, a negative wire connector which is connected to the negative terminal connector by a second segment of electrically conductive material, a resilient top portion to which the terminal connectors are attached, and a resilient side portion to which the wire connectors are attached. The top portion is sized and configured to substantially cover the top portion of the battery when the cover is installed on the battery. The positive and negative terminal connectors are sized and configured to be placed in electrically conductive contact with their respective positive and negative terminals when the cover is installed on the battery, while the positive and negative wire connectors each are sized and configured to be placed in electrically conductive contact with a free end portion of a respective electrical wire. Apparatus for storing and dispensing electrical energy incorporating a cover of this invention is also described.

20 Claims, 3 Drawing Sheets

PROTECTIVE COVER AND CONNECTION DEVICE FOR BATTERIES

TECHNICAL FIELD

This invention relates to devices which connect an electrical storage battery to electrical cable, as well as to devices which cover a battery to protect users from the hazards of battery explosion or leakage.

BACKGROUND

Electrical storage batteries, e.g., electrochemical batteries such as lead acid batteries, have been employed for decades in devices such as, for example, automobiles, farm and other heavy-duty equipment, motorcycles and power boats. While such batteries play a vital role in the electrical systems of such motorized devices and in other electrical devices, their construction and design are such that, under the right circumstances, such batteries can become explosive hazards, especially when they are improperly handled or installed. The corrosive liquid contents of typical batteries can also be quite hazardous in the event of leakage or explosion. To address such concerns, various devices have been made to protect bystanders in the event of an explosion. However, so far as is know, none of these devices provides such protection while also enabling the universal connection of the battery, or the battery and the battery cover, to an associated electrical system. Thus, so far as is known, electrical systems which employ known battery covers continue to require specific lengths of electrical wire or cable with specific preinstalled clamps or connectors at their ends to connect the battery to the associated electrical system. Properly replacing such electrical cable thus requires purchase or fabrication of electrical cable of a specific length having specific connections or clamps at its ends.

A need therefore exists for a resilient battery cover which provides protection against explosion hazards associated with the battery while also enabling the universal connection of the battery to the battery cables of an associated electrical system.

SUMMARY OF THE INVENTION

This invention is deemed to satisfy this need in a highly efficient and economical way. The battery to be covered by a device of this invention typically comprises a top portion, a side wall portion, a positive terminal and a negative terminal. In one embodiment of this invention, a battery cover is provided. The cover comprises a) a positive terminal connector,
b) a negative terminal connector,
c) a positive wire connector which is connected to the positive terminal connector by a first segment of electrically conductive material,
d) a negative wire connector which is connected to the negative terminal connector by a second segment of electrically conductive material,
e) a resilient top portion to which the terminal connectors are attached, and
f) a resilient side portion to which the wire connectors are attached.

The top portion is sized and configured to substantially cover the top portion of the battery when the cover is installed on the battery. The positive and negative terminal connectors are sized and configured to be placed in electrically conductive contact with their respective positive and negative terminals when the cover is installed on the battery. In addition, the positive and negative wire connectors each are sized and configured to be placed in electrically conductive contact with a free end portion of a respective electrical wire.

In another embodiment of this invention, apparatus for storing and dispensing electrical energy is provided. The apparatus comprises a) a battery comprised of a top portion, a side wall portion, a positive terminal and a negative terminal,
b) two electrical wires, and
c) a battery cover comprised of
 i) a positive terminal connector,
 ii) a negative terminal connector,
 iii) a positive wire connector which is connected to the positive terminal connector by a first segment of electrically conductive material,
 iv) a negative wire connector which is connected to the negative terminal connector by a second segment of electrically conductive material,
 v) a resilient top portion to which the terminal connectors are attached, and
 vi) a resilient side portion to which the wire connectors are attached, wherein the top portion is sized and configured to substantially cover the top portion of the battery when the cover is installed on the battery, wherein the positive and negative terminal connectors are sized and configured to be placed in electrically conductive contact with their respective positive and negative terminals when the cover is installed on the battery, and wherein the positive and negative wire connectors each are sized and configured to be placed in electrically conductive contact with a free end portion of a respective one of the electrical wires.

These and other embodiments and features of the invention will become still further apparent from the ensuing description, appended claims and accompanying drawings.

BRIEF DESCRIPTION OF THE DRAWINGS

In each of the above figures, like numerals are used to refer to like or functionally like parts among the several figures.

DETAILED DESCRIPTION OF THE INVENTION

As will now be appreciated, the covers and apparatus of this invention enable virtually any battery having a positive and a negative terminal to be connected to electrical cable without the necessity of having cable of a predetermined length or of using a electrical cable or wire which includes a preinstalled clamp configured to be installed upon a particular type or size of battery. The cover may be used to connect the bare free end portion of any battery cable to virtually any battery, while at the same time providing a shield of protection against the hazards associated with battery explosion and leakage. As used in this description and in the appended claims, the term wire includes a single wire as well as a plurality of wires which are bundled together to form a cable.

Figure 1:
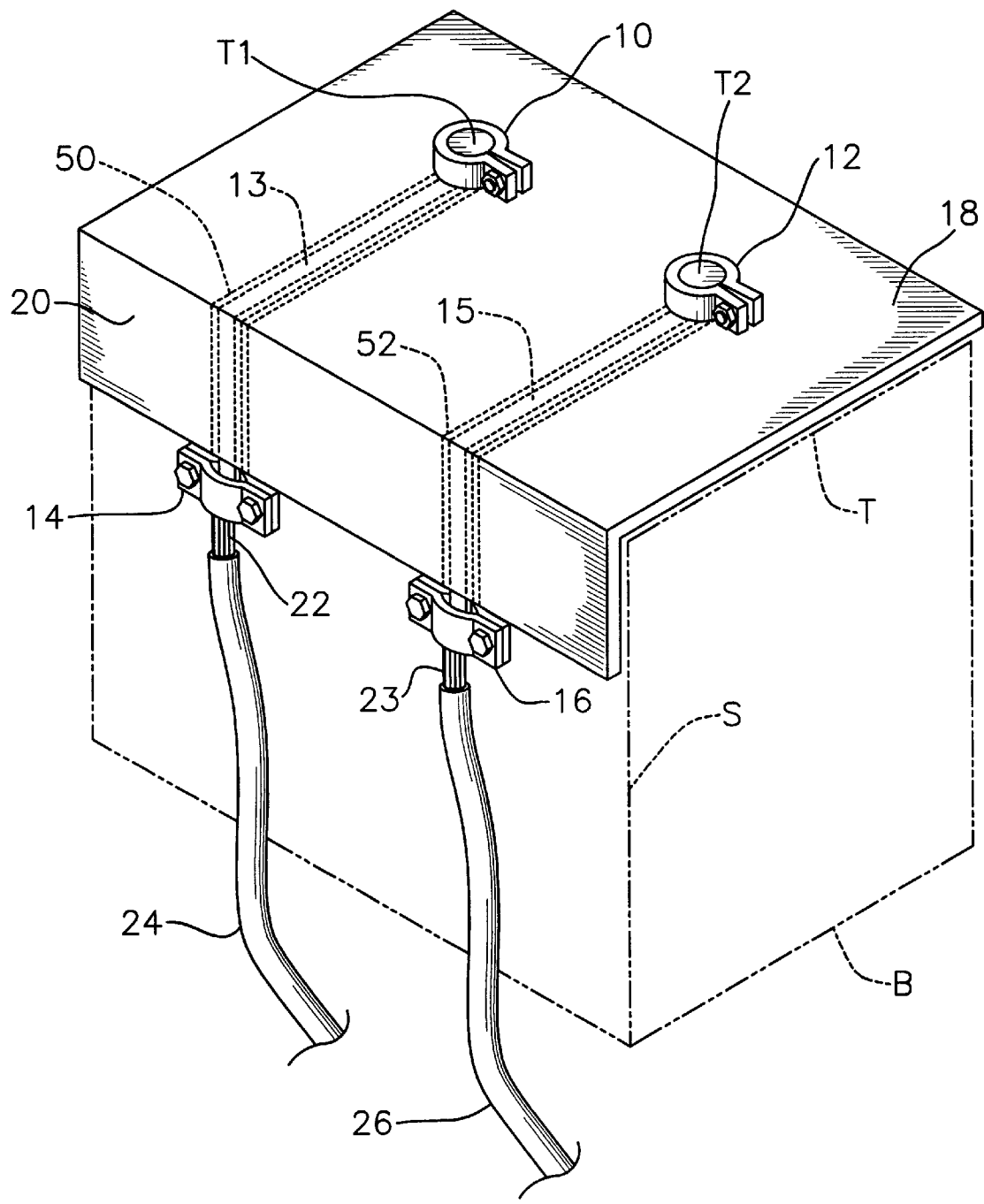
FIG. 1 is a perspective view of a preferred embodiment of this invention.

Referring now to the accompanying figures, FIG. 1 illustrates a preferred cover of this invention which is adapted to be detachably attachable to a battery B. Battery B comprises a top portion T, a side wall portion S, a positive terminal T1 extending up through top portion T and a negative terminal T2 extending up through top portion T. The preferred cover depicted in FIG. 1 comprises a positive terminal connector 10 in the form of a U-shaped clamp, a negative terminal connector 12 in the form of a U-shaped clamp, a positive wire connector 14 in the form of a clamp which is connected to positive terminal connector 10 by a first segment 13 of electrically conductive material, a negative wire connector 16 in the form of a clamp which is connected to negative terminal connector 12 by a second segment 15 of electrically conductive material, a resilient top portion 18 to which terminal connectors 10 and 12 are attached, and a resilient side portion 20 to which wire connectors 14 and 16 are attached. As depicted, segments 13 and 15 are each a strip of copper; however, the electrically conductive material employed may be virtually any material which is capable of conducting electricity, while it is preferably an electrically conductive metal, with copper being particularly preferred. At least a portion of each of first and second segments 13 and 15 extends through a respective one of two passageways 50 and 52, each of passageways 50 and 52 being defined by the top and side portions 18 and 20 and extending therethrough so as to be coplanar therewith. In this way, wire connectors 14 and 16 are disposed proximate to side wall portion S to place the wire connections below the top of battery B, thereby facilitating battery installation in a compact space. Top portion 18 is sized and configured to substantially cover the top portion of battery B when the cover is installed on battery B. As depicted, top portion 18 is fabricated from plexiglass to provide resiliency in the event of sudden impact from an explosion of battery B. However, top portion 18 may be fabricated from a wide variety of other materials, including synthetic composite materials, plastics, etc., as long as the material selected tends to resist damage from corrosion due to battery leakage and damage from sudden impact caused by an explosion of the underlying battery. Positive and negative terminal connectors 10 and 12 are sized and configured to be placed in electrically conductive contact with their respective positive and negative terminals T1 and T2 when the cover is installed on battery B. Positive and negative wire connectors 14 and 16 each are sized and configured to be placed in electrically conductive contact with a respective one of free end portions 22 and 23 of respective electrical cables or wires 24 and 26. In the preferred embodiment depicted, side portion 20 is disposed at a angle of approximately 90 degrees relative to top portion 18, to provide a compact fit on battery B and to provide a downwardly disposed side portion and downwardly disposed wire connectors to which electrical wires 24 and 26 may be attached.

Figure 2:
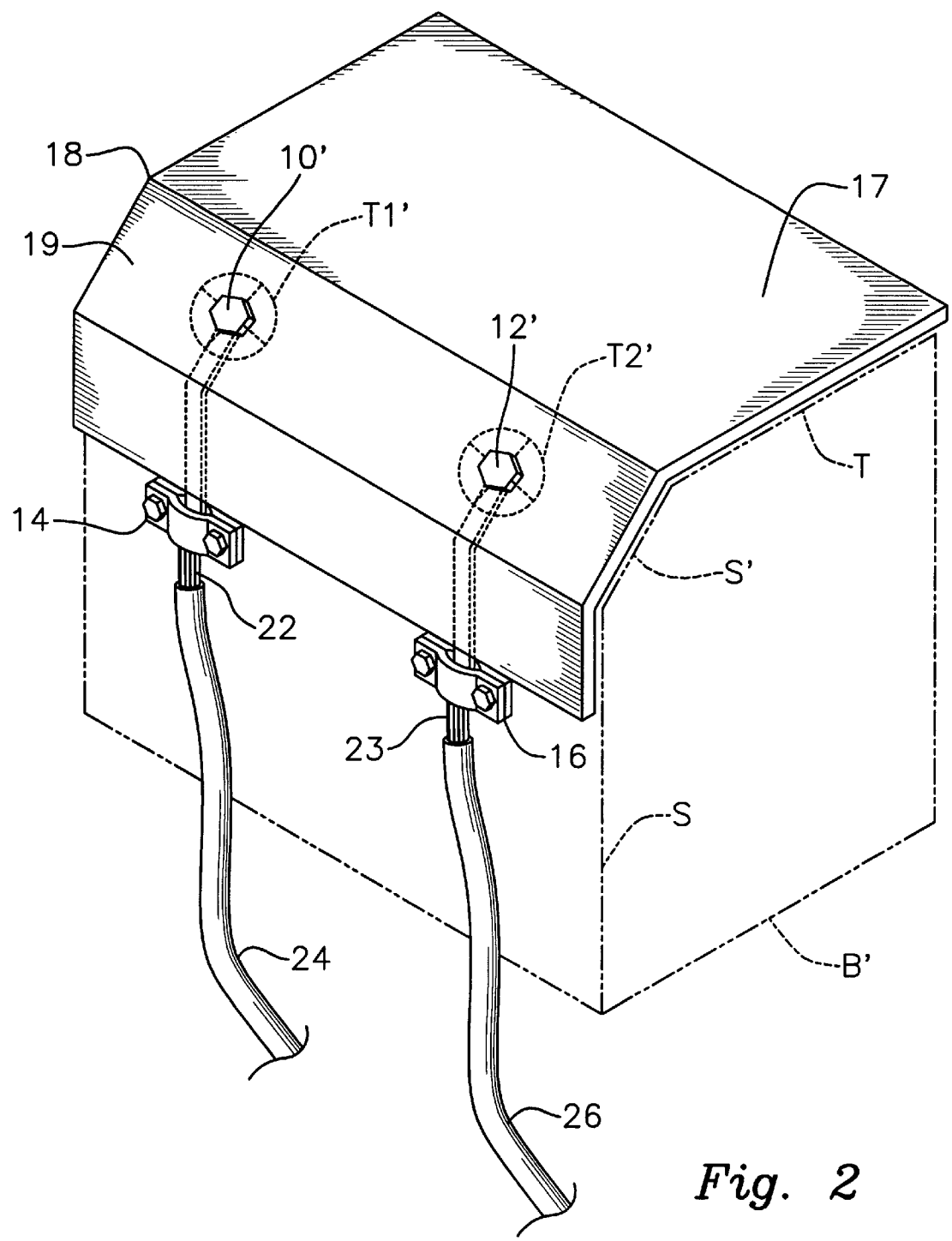
FIG. 2 is a perspective view of another preferred embodiment of this invention.

FIG. 2 illustrates another preferred cover of this invention which is particularly adapted for a battery B' with positive and negative terminals, T1' and T2' respectively, which are each in the form of a threaded aperture. Terminals T1' and T2' of battery B' are disposed at a sloped intermediate side wall portion S' of battery B'. The depicted cover differs from the embodiment of FIG. 1 in that top portion 18 is comprised a primary planar portion 17 and a secondary planar portion 19, primary and secondary planar portions 17 and 19 being disposed relative to one another at an angle of about 135 degrees in the preferred embodiment depicted, and wherein a positive terminal connector 10' and a negative terminal connector 12' are attached to primary planar portion 19. Connectors 10' and 12' are in the form of threaded cylindrical members in the form of bolts which are received by terminals T1' and T2', respectively. It should be appreciated that the angle at which primary and secondary planar portions 17 and 19 are disposed relative to one another may be between 90 and 180 degrees, while about 135 degrees is preferred. This configuration accommodates the particular battery employed and provides the cover with a compact fit with battery B' along intermediate side wall portion S', a downwardly disposed side portion 20 and downwardly disposed wire connectors 14 and 16 to which electrical wires 24 and 26 may be attached.

Figure 3:
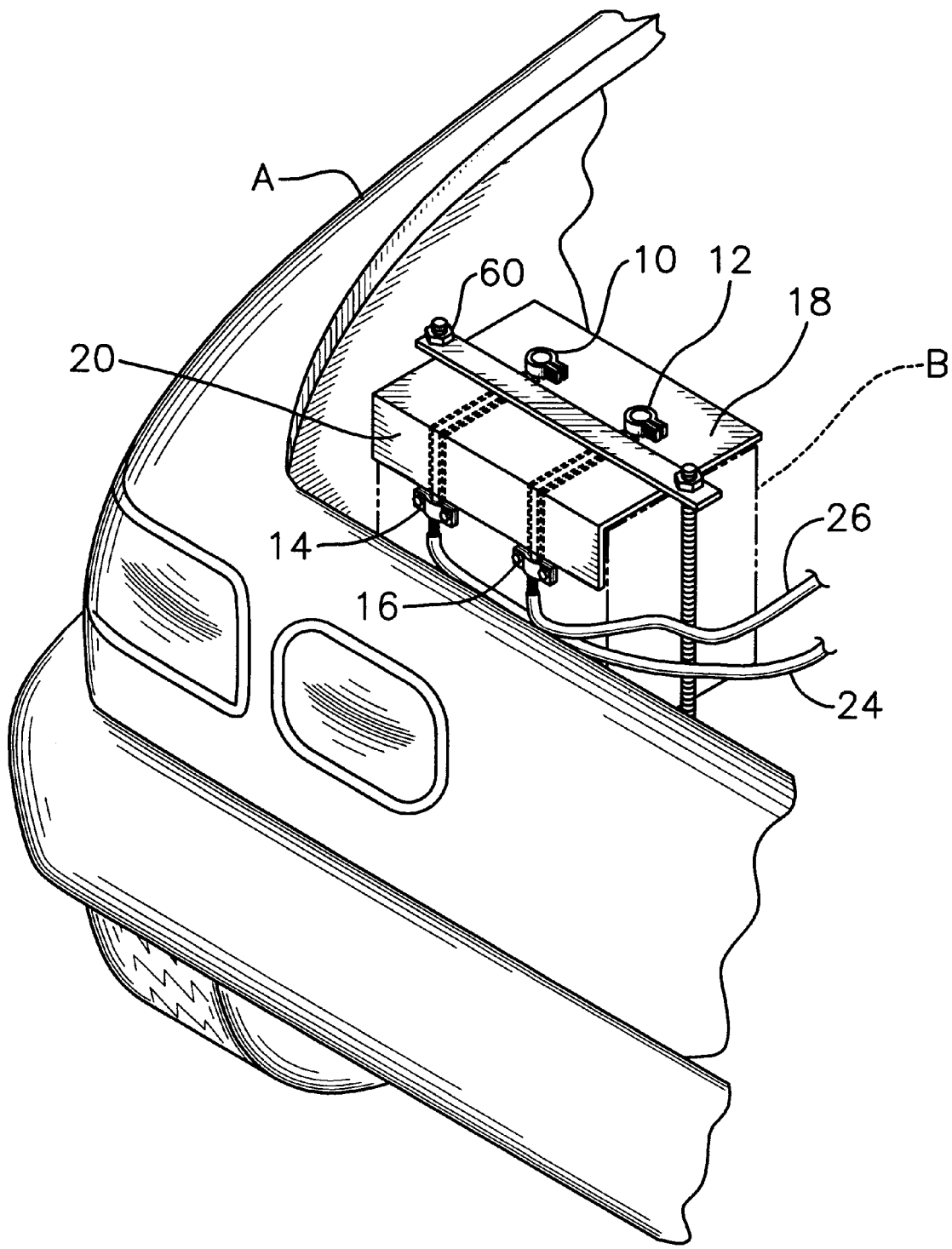
FIG. 3 is a perspective view of the device of FIG. 1 as installed on an automobile battery.

FIG. 3 illustrates a preferred apparatus of this invention for storing and dispensing electrical energy, in which the device of FIG. 1 has been installed on an automobile battery B within automobile A. The preferred apparatus depicted comprises battery B, two electrical wires 24 and 26, and a battery cover as illustrated in FIG. 1. Of course, in an alternative embodiment in which the battery described with reference to FIG. 2 is employed, the cover of FIG. 2 may be substituted as the battery cover in the apparatus of this invention. A two-piece clamp 60 is further provided as securing means for resiliently securing the cover to battery B and to thereby provide some protection against projectiles or liquid battery contents in the event of battery explosion or leakage. As depicted, clamp 60 also secures battery B to the automobile. It will be understood that the securing means employed is not limited to the two-piece clamp depicted here, but may take the form of a wide variety of devices. Non-limiting examples of such devices include clamps, straps, screws, bolts, and the like, as well as combinations thereof. Electrical energy may be stored in and dispensed from battery B through its electrically conductive contact with and connection to the battery cover of this invention, which cover in turn is in electrically conductive contact with and connected to wires 24 and 26. Wires 24 and 26 typically are connected to a conventional electrical system of automobile A, the electrical system in turn being capable of generating and/or consuming electrical energy.

Those of ordinary skill in the art will appreciate that the terminal connectors and wire connectors of this invention may be attached directly to their respective top or side portion of the cover while also being attached to a respective end of the respective strip of copper or other electrically conductive material. Alternatively, these connectors may be attached only indirectly to their respective top or side portion by being attached to a respective end of the strip of copper or other electrically conductive material which extends through the passageway formed by the cover. In this way, the strip of copper or other electrically conductive material retains the connectors proximate to the respective side or top portion of the cover. Both of these methods of attachment are within the scope of this invention. Additionally, it now will be appreciated that the cover and apparatus of this invention eliminate the need to use specified length battery cable having preinstalled clamps or other connecting devices at the ends. Battery cable may be cut to any desired length, and a free end of the cable may be connected to the battery cover once any insulation surrounding the bare cable wire is removed. Since the battery cover may be connected to the battery itself, the electrical wire may be placed in electrically conductive communication with the battery once the cover is attached to the battery at the battery terminals and the electrical wire is connected to the cover at the wire connectors.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A battery cover which is detachably attachable to a battery, the battery comprising a top portion, a side wall portion, a positive terminal and a negative terminal, the battery cover comprising:
   a) a positive terminal connector,
   b) a negative terminal connector,
   c) a positive wire connector which is connected to the positive terminal connector by a first segment of electrically conductive material,
   d) a negative wire connector which is connected to the negative terminal connector by a second segment of electrically conductive material,
   e) a resilient top portion to which the terminal connectors are attached, and
   f) a resilient side portion to which the wire connectors are attached,
wherein the top portion is sized and configured to substantially cover the top portion of the battery when the cover is installed on the battery, wherein the positive and negative terminal connectors are sized and configured to be placed in electrically conductive contact with their respective positive and negative terminals when the cover is installed on the battery, and wherein the positive and negative wire connectors each are sized and configured to be placed in electrically conductive contact with a free end portion of a respective electrical wire.

2. A cover according to claim 1 wherein the electrically conductive material is an electrically conductive metal.

3. A cover according to claim 2 wherein at least a portion of each of the segments of electrically conductive metal extends through a respective passageway, each of the passageways being defined by the top and side portions and extending therethrough so as to be coplanar therewith.

4. A cover according to claim 1 further comprising securing means for resiliently securing the cover to the battery.

5. A cover according to claim 1 wherein the top portion comprises a primary planar portion and a secondary planar portion, the primary and secondary planar portions being disposed at an angle which is between 90 and 180 degrees relative to one another, and wherein the terminal connectors are attached to the primary planar portion.

6. A cover according to claim 5 wherein each of the positive and negative terminal connectors is a threaded bolt.

7. A cover according to claim 6 wherein the electrically conductive material is an electrically conductive metal.

8. A cover according to claim 7 wherein at least a portion of each of the segments of electrically conductive metal extends through a respective passageway, each of the passageways being defined by the top and side portions and extending therethrough so as to be coplanar therewith.

9. A cover according to claim 8 further comprising securing means for resiliently securing the cover to the battery.

10. A cover according to claim 1 wherein the top and side portion are each planar in shape and are connected to one another at an angle of about 90 degrees.

11. A cover according to claim 10 wherein each of the positive and negative terminal connectors is a clamp.

12. A cover according to claim 11 wherein the electrically conductive material is an electrically conductive metal.

13. A cover according to claim 4 wherein at least a portion of each of the segments of electrically conductive metal extends through a respective passageway, each of the passageways being defined by the top and side portions and extending therethrough so as to be coplanar therewith.

14. A cover according to claim 13 further comprising securing means for resiliently securing the cover to the battery.

15. A cover according to claim 1 wherein each of the positive and negative terminal connectors is a clamp.

16. A cover according to claim 1 wherein each of the positive and negative terminal connectors is a threaded bolt.

17. Apparatus for storing and dispensing electrical energy which comprises
   a) a battery comprised of a top portion, a side wall portion, a positive terminal and a negative terminal,
   b) two electrical wires, and
   c) a battery cover comprised of
      i) a positive terminal connector,
      ii) a negative terminal connector,
      iii) a positive wire connector which is connected to the positive terminal connector by a first segment of electrically conductive material,
      iv) a negative wire connector which is connected to the negative terminal connector by a second segment of electrically conductive material,
      v) a resilient top portion to which the terminal connectors are attached, and
      vi) a resilient side portion to which the wire connectors are attached,
wherein the top portion is sized and configured to substantially cover the top portion of the battery when the cover is installed on the battery, wherein the positive and negative terminal connectors are sized and configured to be placed in electrically conductive contact with their respective positive and negative terminals when the cover is installed on the battery, and wherein the positive and negative wire connectors each are sized and configured to be placed in electrically conductive contact with a free end portion of a respective one of the electrical wires.

18. Apparatus according to claim 17 wherein the top portion of the cover comprises a primary planar portion and a secondary planar portion, the primary and secondary planar portions being disposed at an angle between 90 and 180 degrees relative to one another, and wherein the terminal connectors are attached to the primary planar portion.

19. Apparatus according to claim 17 wherein the top and side portion of the cover are each planar in shape and are connected to one another at an angle of about 90 degrees.

20. Apparatus according to claim 17 further comprising securing means for resiliently securing the cover to the battery.

* * * * *